(12) United States Patent
Takaishi et al.

(10) Patent No.: US 11,451,411 B2
(45) Date of Patent: Sep. 20, 2022

(54) FIRST RELAY DEVICE, SECOND RELAY DEVICE, AND RELAY SYSTEM

(71) Applicant: TOYOTA JIDOSHA KABUSHIKI KAISHA, Toyota (JP)

(72) Inventors: Daisuke Takaishi, Toyota (JP); Keisuke Tsuji, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/148,704

(22) Filed: Jan. 14, 2021

(65) Prior Publication Data

US 2021/0226814 A1    Jul. 22, 2021

(30) Foreign Application Priority Data

Jan. 22, 2020  (JP) .............................. JP2020-008494

(51) Int. Cl.
*H04L 12/40* (2006.01)
*H04B 7/155* (2006.01)

(52) U.S. Cl.
CPC ....... *H04L 12/40052* (2013.01); *H04B 7/155* (2013.01); *H04L 2012/40273* (2013.01)

(58) Field of Classification Search
None
See application file for complete search history.

(56) References Cited

U.S. PATENT DOCUMENTS

| 5,499,247 A * | 3/1996 | Matsuda ............... H04L 1/1607 370/445 |
| 10,124,764 B1 * | 11/2018 | Ahmed ............... H04L 63/1425 |
| 2011/0160951 A1 * | 6/2011 | Ishigooka ............... G07C 3/02 701/31.4 |
| 2012/0307836 A1 * | 12/2012 | Ishigooka ......... H04L 12/40006 370/401 |
| 2015/0358351 A1 * | 12/2015 | Otsuka ................... H04L 12/66 726/23 |
| 2016/0323287 A1 * | 11/2016 | Kishikawa ........ H04L 12/40013 |
| 2018/0039591 A1 * | 2/2018 | La Marca ............... G06F 13/36 |
| 2018/0097721 A1 * | 4/2018 | Matsui ................... H04L 45/28 |

(Continued)

FOREIGN PATENT DOCUMENTS

| JP | 2007-336267 A | 12/2007 |
| JP | 2014-39085 A | 2/2014 |
| JP | 2017-147695 A | 8/2017 |

*Primary Examiner* — Nicholas Sloms
(74) *Attorney, Agent, or Firm* — Oblon, McClelland, Maier & Neustadt, L.L.P.

(57) ABSTRACT

A first relay device for installation at a vehicle, the first relay device comprising, a first memory and a first processor coupled to the first memory. The first processor being configured to receive a communication frame transmitted from another relay device. The first processor being configured to based on first relay information, in which destination address information expressing a destination address of a communication frame and a relay target bus are associated with each other, and based on the destination address information included in the received communication frame, identify the relay target bus. The first processor being configured to in a case in which the relay target bus of the received communication frame is not identified, output an anomaly notification signal indicating an anomaly to the other relay device.

9 Claims, 9 Drawing Sheets

(56) References Cited

U.S. PATENT DOCUMENTS

| | | | |
|---|---|---|---|
| 2018/0109622 A1* | 4/2018 | Galula | H04L 67/12 |
| 2018/0113836 A1* | 4/2018 | Hirata | H04L 69/40 |
| 2018/0131712 A1* | 5/2018 | Cornelio | H04L 63/1416 |
| 2018/0152472 A1* | 5/2018 | Amano | H04W 12/122 |
| 2018/0287922 A1* | 10/2018 | Hirata | H04L 43/062 |
| 2019/0173902 A1* | 6/2019 | Takahashi | G06K 9/6232 |
| 2019/0173912 A1* | 6/2019 | Ujiie | H04L 63/1408 |
| 2020/0204395 A1* | 6/2020 | Takahashi | H04L 12/40 |
| 2020/0312060 A1* | 10/2020 | Shi | G07C 5/0808 |
| 2020/0351168 A1* | 11/2020 | Hirano | H04L 12/40 |
| 2020/0379941 A1* | 12/2020 | Okajima | H04L 43/16 |
| 2021/0021498 A1* | 1/2021 | Sugashima | H04L 12/40182 |
| 2021/0226872 A1* | 7/2021 | Ujiie | H04L 12/40 |
| 2021/0258187 A1* | 8/2021 | Wada | H04L 12/66 |
| 2021/0377074 A1* | 12/2021 | Yoshida | H04L 12/28 |

* cited by examiner

| COMMUNICATION FRAME ID | RELAY TARGET BUS |
|---|---|
| 200h | A1 |
| 210h | A2 |
| 230h | A3 |
| ... | ... |

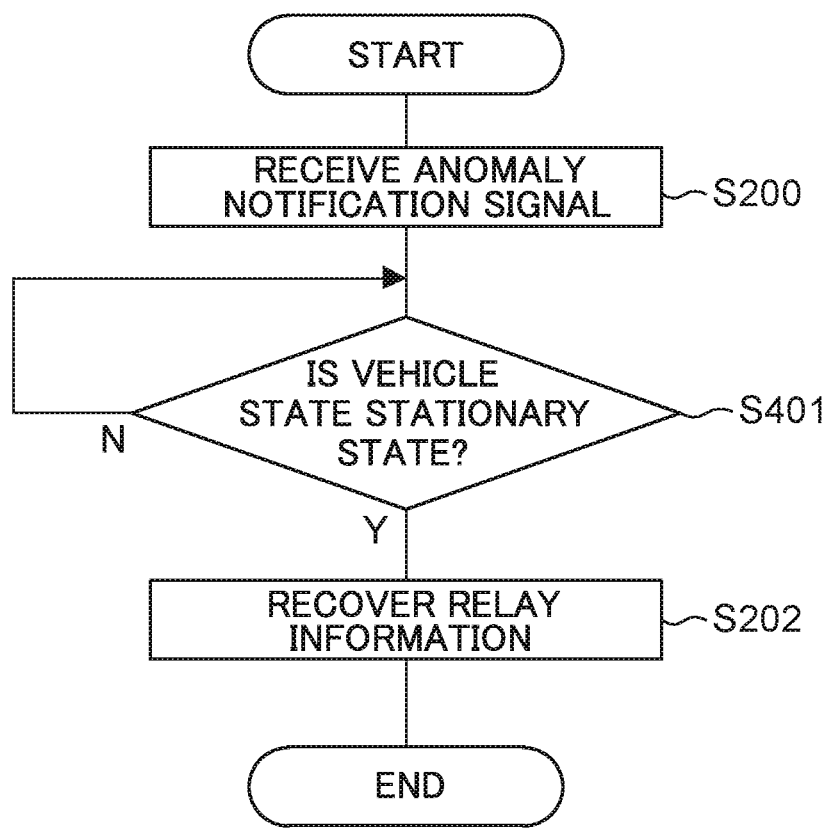

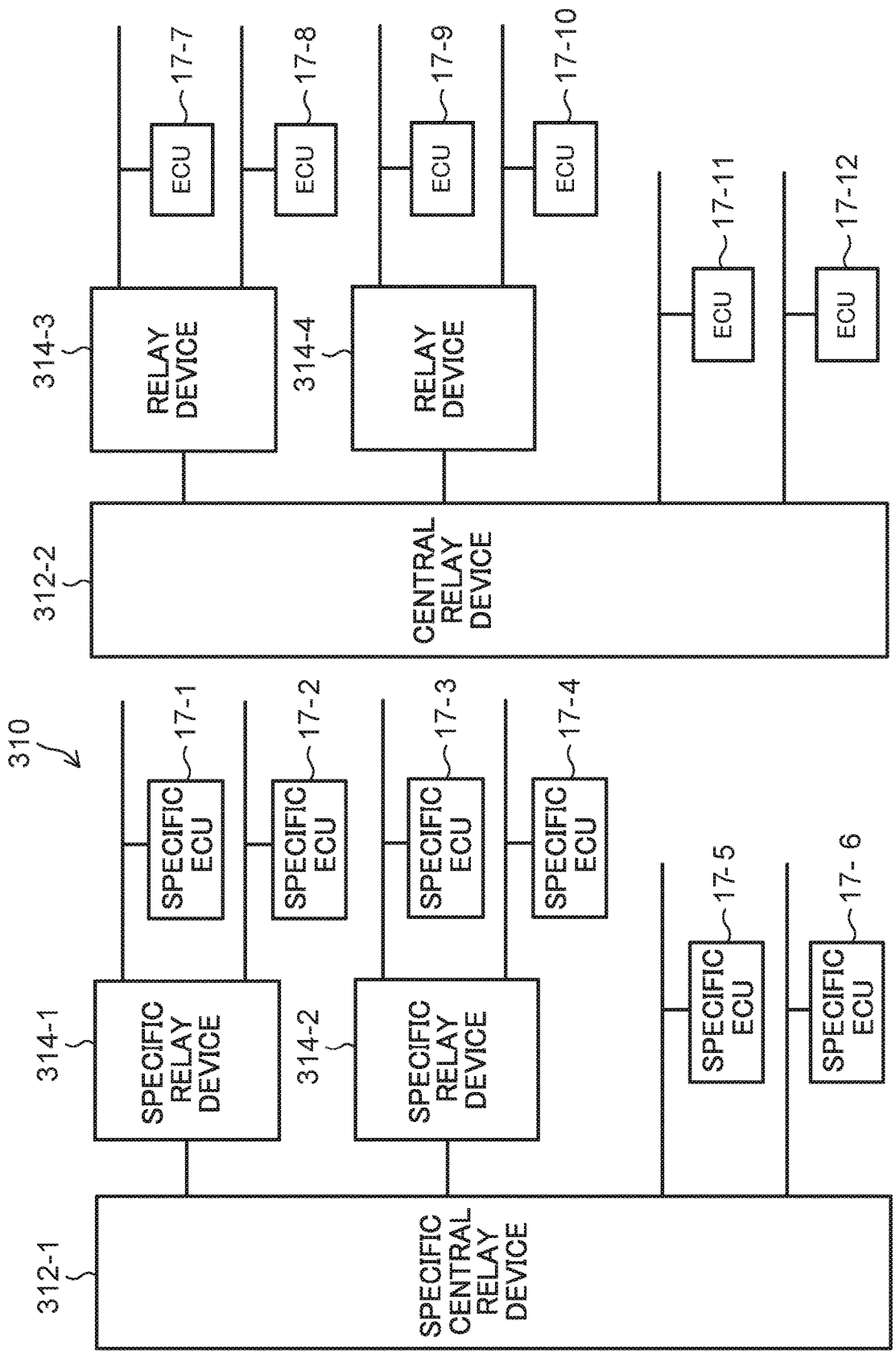

FIRST RELAY DEVICE, SECOND RELAY DEVICE, AND RELAY SYSTEM

CROSS-REFERENCE TO RELATED APPLICATION

This application is based on and claims priority under 35 USC 119 from Japanese Patent Application No. 2020-8494 filed on Jan. 22, 2020, the disclosure of which is incorporated by reference herein.

BACKGROUND

Technical Field

Technology disclosed herein relates to a first relay device, a second relay device, a recording medium, and a relay system.

Background Art

Japanese Patent Application Laid-Open (JP-A) No. 2007-336267 discloses an onboard communication system in which a gateway device is installed. In this onboard communication system, one electronic control unit out of plural electronic control units configures a gateway function electronic control unit, and the gateway function electronic control unit is connected to a communication line of a separate multiplex communication network.

SUMMARY

Technical Problem

Relay devices such as gateways refer to relay information in their own possession to relay communication frames to a bus indicated in the relay information. Destination address information expressing a destination address of the communication frame and information of the bus through which to relay the communication frame are associated with each other in the relay information. However, errors may arise in the relay information employed by the relay device. In cases in which such an error arises in the relay information, the relay device is unable to relay the communication frame to the correct bus.

In the onboard system disclosed in JP-A No. 2007-336267, in cases in which an error arises in the relay information in the possession of a relay device, the relay device is unable to detect the error in the relay information in its own possession. Accordingly, in technology hitherto, an issue exists in that it is not possible to detect an error in the relay information employed when relaying a communication frame between plural relay devices installed in the vehicle.

In consideration of the above circumstances, the technology disclosed herein provides a first relay device, a second relay device, a recording medium, and a relay system capable of detecting an error in relay information employed when relaying a communication frame between plural relay devices installed in a vehicle.

Solution to Problem

A first relay device of a first aspect is a first relay device for installation in a vehicle. The first relay device includes: a first reception section configured to receive a communication frame transmitted from another relay device; a first identification section that, based on first relay information in which destination address information expressing a destination address of a communication frame and a relay target bus are associated with each other and based on the destination address information included in the communication frame received by the first reception section, is configured to identify the relay target bus associated with the destination address information in the first relay information as a relay target bus of the communication frame received by the first reception section; and a notification signal output section that, in cases in which the relay target bus of the communication frame received by the first reception section is not identified by the first identification section due to the destination address information of the communication frame received by the first reception section not being included in the destination address information of the first relay information, is configured to output an anomaly notification signal indicating an anomaly to the other relay device.

The first relay device receives the communication frame transmitted from the other relay device. Based on the first relay information in which the destination address information expressing the destination address of the communication frame and the relay target bus are associated with each other and based on the destination address information included in the communication frame received by the first reception section, the first relay device then identifies the relay target bus associated with the destination address information in the first relay information as the relay target bus of the communication frame received by the first reception section.

In cases in which the relay target bus of the communication frame received by the first reception section is not identified by the first identification section due to the destination address information of the communication frame received by the first reception section not being included in the destination address information of the first relay information, the first relay device outputs the anomaly notification signal indicating an anomaly to the other relay device. This enables any errors in the relay information employed in communication frame relay to be detected. Moreover, the other relay device from which the communication frame was transmitted is able to detect that the relay information in its own possession might be erroneous using the anomaly notification signal output from the first relay device.

A first relay device of a second aspect further includes a first recovery section configured to recover the first relay information in cases in which the relay target bus of the communication frame received by the first reception section is not identified by the first identification section. Thus, in cases in which the relay information of the relay device to which the communication frame was transmitted is erroneous, the relay information can be recovered, and the error that has arisen in the relay information can be amended.

The first recovery section of a first relay device of a third aspect is configured to recover the first relay information in cases in which a vehicle state is a predetermined state. Limiting relay information recovery to when the vehicle is in the predetermined state enables any effect of the relay information recovery on the vehicle to be reduced.

The first recovery section of a first relay device of a fourth aspect is configured to recover the first relay information when the vehicle state is a stationary state in cases in which a stoppage of the first relay device is needed in order to recover the first relay information. Limiting relay information recovery to when the vehicle is stationary enables any effect of the relay information recovery on vehicle travel to be reduced.

A second relay device of a fifth aspect is a second relay device connected to the first relay device so as to be capable of communicating therewith. The second relay device includes: a second reception section configured to receive respective signals each including a communication frame transmitted from another relay device; a second identification section that, based on second relay information in which destination address information expressing a destination address of a communication frame and a relay target bus are associated with each other and based on the destination address information included in the communication frame received by the second reception section, is configured to identify the relay target bus associated with the destination address information in the second relay information as a relay target bus of the communication frame received by the second reception section; and a second recovery section configured to recover the second relay information in cases in which the anomaly notification signal output from the first relay device has been received by the second reception section. The second relay device from which the communication frame was transmitted recovers the second relay information using the second recovery section on receiving the anomaly notification signal from the first relay device to which the communication frame was transmitted. Thus, in cases in which the relay information in the possession of the second relay device is erroneous, this error can be amended.

The second recovery section of a second relay device of a sixth aspect is configured to recover the second relay information in cases in which the anomaly notification signal has been received on plural occasions. This enables recovery to be performed for relay information that may be considered more likely to be erroneous.

The second recovery section of a second relay device of a seventh aspect is configured to recover the second relay information in cases in which a vehicle state is a predetermined state. Limiting relay information recovery to when the vehicle is in the predetermined state enables any effect of the relay information recovery on the vehicle to be reduced.

The second recovery section of a second relay device of an eighth aspect is configured to recover the second relay information when the vehicle state is a stationary state in cases in which a stoppage of the second relay device is needed in order to recover the second relay information. Limiting relay information recovery to when the vehicle is stationary enables any effect of the relay information recovery on vehicle travel to be reduced.

The second recovery section of a second relay device of a ninth aspect is configured to recover the second relay information when the anomaly notification signal has been received on plural occasions in cases in which a number of relay devices connected to the second relay device is greater than a number of relay devices connected to the first relay device. In cases in which the number of other relay devices connected to the second relay device is greater than the number of relay devices connected to the first relay device, the second relay device does not immediately recover the second relay information, even if the anomaly notification signal has been received. This enables any effect on the connected relay devices as a result of the second relay device recovering the second relay information to be reduced. Moreover, the second relay device recovers the second relay information in cases in which anomaly notification signals have been received on a predetermined number of occasions or greater, thereby enabling the second relay information to be recovered in cases in which out of the first relay device and the second relay device, the second relay information of the second relay device is more likely to be erroneous.

A relay system of a tenth aspect is a relay system including the first relay device and the second relay device.

A relay system of an eleventh aspect is a relay system including plural of the first relay devices and plural of the second relay devices. Plural vehicle travel control units involved in vehicle travel are connected to a first specific relay device configured by a specific first relay device from out of the plural first relay devices. Plural vehicle travel control units involved in vehicle travel are connected to a second specific relay device configured by a specific second relay device from out of the plural second relay devices. Plural vehicle control units different from the vehicle travel control units are connected to a first relay device different from the first specific relay device from out of the plural first relay devices. Plural vehicle control units different from the vehicle travel control units are connected to a second relay device different from the second specific relay device from out of the plural second relay devices. The first recovery section of the first specific relay device recovers the first relay information in cases in which the relay target bus of the communication frame received by the first reception section is not identified by the first identification section and the vehicle state is in a stationary state. The second recovery section of the second specific relay device recovers the second relay information in cases in which the anomaly notification signal has been received by the second reception section from a relay device to which the communication frame was transmitted and the vehicle state is also a stationary state. The first recovery section of the first relay device that is different from the first specific relay device recovers the first relay information in cases in which the relay target bus of the communication frame received by the first reception section is not identified by the first identification section. The second recovery section of the second relay device that is different from the second specific relay device recovers the second relay information in cases in which the anomaly notification signal has been received by the second reception section from the relay device to which the communication frame was transmitted. The first specific relay device and the second specific relay device that are each connected to plural vehicle travel control units involved in vehicle travel each recover the second relay information in cases in which the vehicle state is a stationary state. This enables the relay information to be recovered without affecting the specific ECUs that are involved in vehicle travel.

A first relay method of a twelfth aspect is a first relay method for execution by a first relay device installed in a vehicle, the first relay device being configured to execute processing wherein: a first reception section receives a communication frame transmitted from another relay device; based on first relay information in which destination address information expressing a destination address of a communication frame and a relay target bus are associated with each other and based on the destination address information included in the communication frame received by the first reception section, a first identification section identifies the relay target bus associated with the destination address information in the first relay information as a relay target bus of the communication frame received by the first reception section; and in cases in which the relay target bus of the communication frame received by the first reception section is not identified by the first identification section due to the destination address information of the communication frame received by the first reception section not being included in the destination address information of the relay information, a notification signal output section outputs an anomaly notification signal indicating an anomaly to the other relay device.

A second relay method of a thirteenth aspect is a second relay method for execution by a second relay device connected to the first relay device that executes the first relay method of the twelfth aspect so as to be capable of communicating therewith, the second relay device being configured to execute processing in which: a second reception section receives a communication frame transmitted from another relay device; based on second relay information in which destination address information expressing a destination address of a communication frame and a relay target bus are associated with each other and based on the destination address information included in the communication frame received by the second reception section, a second identification section identifies a relay target bus associated with the destination address information in the second relay information as a relay target bus of the communication frame received by the second reception section; and a second recovery section recovers the second relay information in cases in which the anomaly notification signal output from the first relay device has been received by the second reception section.

A first relay program of a fourteenth aspect is a program for execution by a first relay device installed in a vehicle, the first relay program being configured to cause a computer to execute processing including: receiving a communication frame transmitted from another relay device; based on first relay information in which destination address information expressing a destination address of a communication frame and a relay target bus are associated with each other and based on the destination address information included in the received communication frame, identifying the relay target bus associated with the destination address information in the first relay information as a relay target bus of the received communication frame; and in cases in which the relay target bus of the received communication frame is not identified due to the destination address information of the received communication frame not being included in the destination address information of the first relay information, outputting an anomaly notification signal indicating an anomaly to the other relay device.

A second relay program of a fifteenth aspect is a program for execution by a second relay device connected to the first relay device that executes the first relay method of the twelfth aspect so as to be capable of communicating therewith, the second relay program being configured to cause a computer to execute processing including: receiving a communication frame transmitted from another relay device; based on second relay information in which destination address information expressing a destination address of a communication frame and a relay target bus are associated with each other and based on the destination address information included in the received communication frame, identifying a relay target bus associated with the destination address information in the second relay information as a relay target bus of the received communication frame; and recovering the second relay information in cases in which the anomaly notification signal output from the first relay device has been received.

Advantageous Effects of Invention

As described above, the technology disclosed herein has an advantageous effect of enabling detection of an error in relay information employed when relaying a communication frame between plural relay devices installed in a vehicle.

BRIEF DESCRIPTION OF DRAWINGS

FIG. 9 is a flowchart illustrating an example of second relay processing of the second exemplary embodiment; and FIG. 10 is a block diagram illustrating an example of configuration of a relay system according to a third exemplary embodiment.

DESCRIPTION OF EMBODIMENTS

Explanation follows regarding relay systems of exemplary embodiments, with reference to the drawings.

First Exemplary Embodiment

Figure 1:
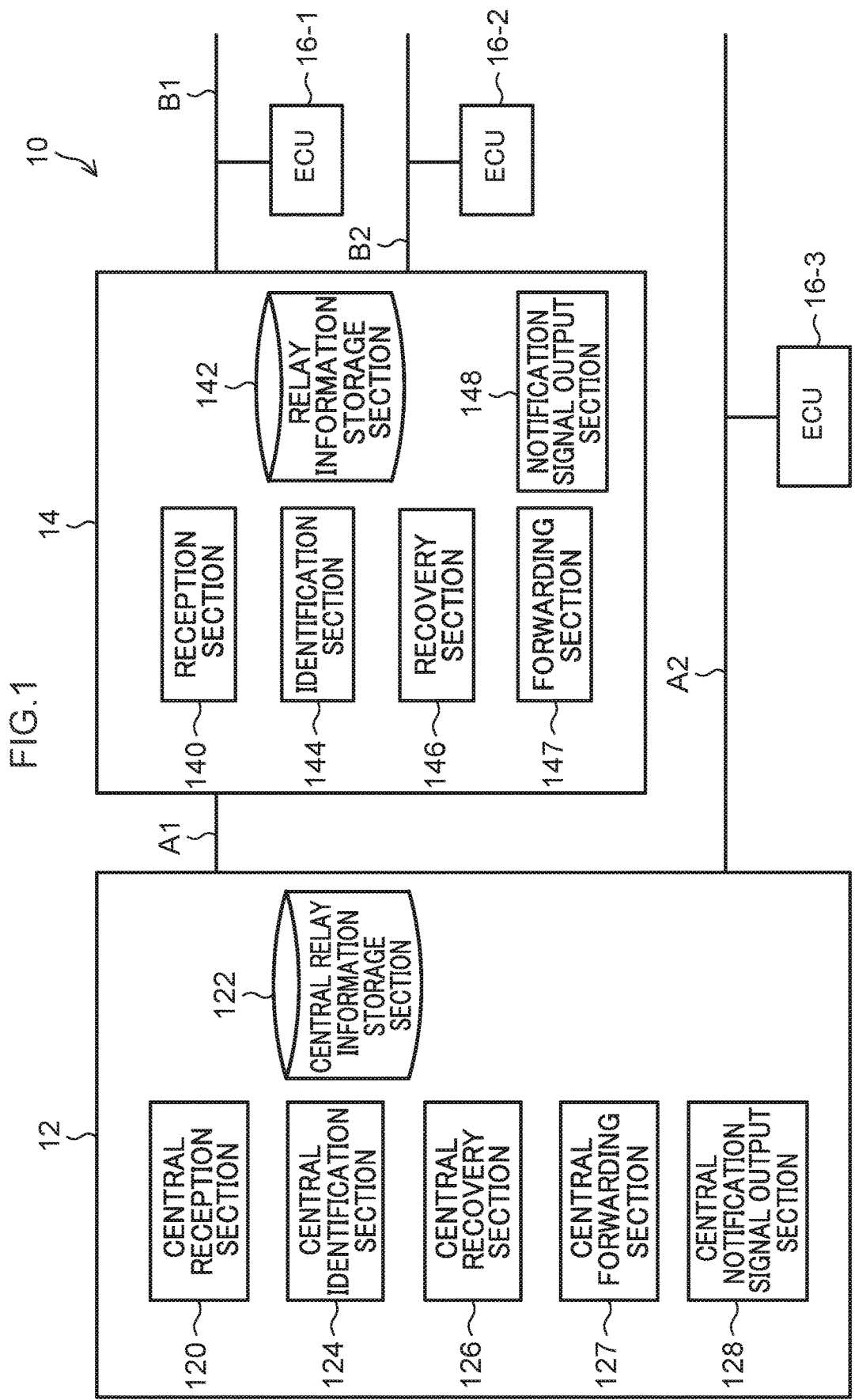
FIG. 1 is a block diagram illustrating an example of configuration of a relay system according to a first exemplary embodiment and a second exemplary embodiment.

FIG. 1 is a block diagram illustrating an example of configuration of a relay system according to a first exemplary embodiment. As illustrated in FIG. 1, a relay system 10 of the first exemplary embodiment includes a central relay device 12, serving as an example of a first relay device, a relay device 14, serving as an example of a second relay device, and plural ECUs 16-1, 16-2, and 16-3. The relay system 10 is installed in a vehicle. Note that the central relay device 12 and the relay device 14 are, for example, gateway function electronic control units (ECUs).

In cases in which a gateway function ECU is installed in a vehicle, the gateway function ECU employs relay information expressing a routing map to relay communication frames. The gateway function ECU is thus required to possess correct relay information at all times.

However, in cases in which relay information is partly modified due to data corruption or unexpected overwriting as a result of a memory anomaly in the ECU, there is a possibility of communication frames being incorrectly relayed. This may result in normal vehicle operation being affected.

Accordingly, in the relay system of the present exemplary embodiment, either the central relay device 12 or the relay device 14, these being gateway function ECUs, check the relay information in their own possession when a communication frame is received from a relay device that is another gateway function ECU. The central relay device 12 or the relay device 14 also checks whether or not a communication frame ID of the received communication frame is recorded in the relay information, and relays to a relay target bus in cases in which the communication frame ID is recorded in the relay information. On the other hand, in cases in which the communication frame ID of the received communication frame is not recorded in the relay information, the central relay device 12 or the relay device 14 determines that an anomaly has occurred and notifies the other relay device from which transmission was performed. Specific explanation follows regarding this.

As illustrated in FIG. 1, the central relay device 12 and the relay device 14 are connected together so as to be capable of communicating with each other through a bus A1. As illustrated in FIG. 1, the central relay device 12 and the ECU 16-3 are connected together through a bus A2. Moreover, as illustrated in FIG. 1, the relay device 14 and the ECU 16-1 are connected together through a bus B1, and the relay device 14 and the ECU 16-2 are connected together through a bus B2.

As illustrated in FIG. 1, the central relay device 12 includes a central reception section 120, a central relay information storage section 122, a central identification section 124, a central recovery section 126, a central forwarding section 127, and a central notification signal output section 128.

The central reception section 120 receives a communication frame transmitted from another relay device. For example, the central reception section 120 receives a communication frame transmitted from the relay device 14, this being an example of another relay device.

The central relay information storage section 122 stores central relay information, this being an example of first relay information. The central relay information is information in which a communication frame ID, this being an example of destination address information expressing a destination address of the communication frame, is associated with a relay target bus. The central relay device 12 refers to the central relay information stored in the central relay information storage section 122 to relay a communication frame received by the central reception section 120 to a predetermined bus. Note that in the following explanation, the central relay information and relay information are sometimes referred to collectively as "relay information". The central relay device 12 and the relay device 14 are sometimes referred to collectively as "relay devices".

Figures 2, 3:
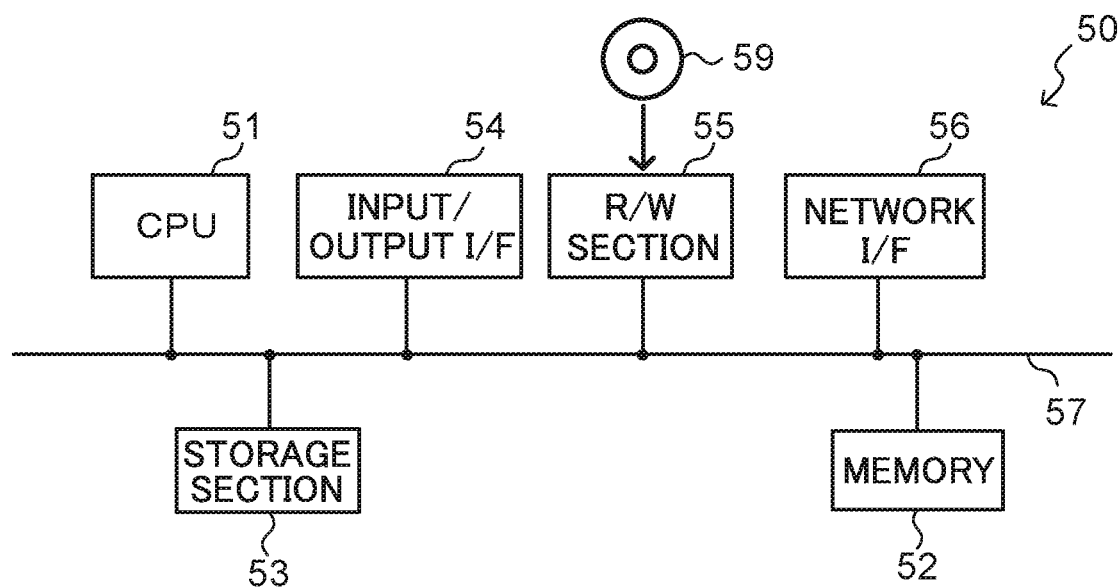
FIG. 2 is a table illustrating an example of central relay information.
FIG. 3 is a diagram illustrating an example of configuration of a computer configuring various devices included in a relay system.

FIG. 2 illustrates an example of the central relay information. As illustrated in FIG. 2, the central relay information may be information in a table format. In the example of FIG. 2, communication frame IDs, these being an example of destination address information expressing the destination address of each communication frame, are associated with bus information expressing the relay target bus for the communication frame corresponding to the communication frame ID.

The central identification section 124 identifies the relay target bus of the communication frame received by the central reception section 120 based on the central relay information held in the central relay information storage section 122 and the communication frame ID included in the communication frame received by the central reception section 120. Specifically, the central identification section 124 reads the central relay information from the central relay information storage section 122, and refers to this relay information to identify the bus associated with the communication frame ID included in the received communication frame as the relay target bus.

The central recovery section 126 recovers the read central relay information in cases in which the relay target bus of the communication frame received by the central reception section 120 is not identified by the central identification section 124. Specifically, the central recovery section 126 recovers the read central relay information using existing technology.

For example, the central recovery section 126 reads backup central relay information held in a predetermined storage section (not illustrated in the drawings) different from the central relay information storage section 122. The central recovery section 126 employs the backup central relay information to recover the central relay information held in the central relay information storage section 122.

Specifically, for example, the central recovery section 126 acquires the backup central relay information held in a storage section (not illustrated in the drawings) of an external server (not illustrated in the drawings), and employs the backup central relay information to recover the central relay information in the central relay information storage section 122.

As another example, the central recovery section 126 reads backup central relay information held in the central relay device 12 in a different storage section (not illustrated in the drawings) from the central relay information storage section 122, and employs the backup central relay information to recover the central relay information held in the central relay information storage section 122.

After recovery of the central relay information by the central recovery section 126 has been completed, the central identification section 124 refers to this central relay information and attempts to identify the relay target bus of the communication frame received by the central reception section 120. Specifically, the central identification section 124 determines whether or not the communication frame ID of the communication frame received by the central reception section 120 is included in the central relay information.

In cases in which the relay target bus of the communication frame received by the central reception section 120 is identified by the central identification section 124, the central forwarding section 127 forwards the communication frame received by the central reception section 120 to the identified relay target bus. On the other hand, in cases in which the relay target bus of the communication frame received by the central reception section 120 is not identified by the central identification section 124, the central forwarding section 127 discards the communication frame.

In cases in which the relay target bus of the communication frame received by the central reception section 120 is not identified by the central identification section 124, the central notification signal output section 128 outputs an anomaly notification signal indicating an anomaly to the relay device from which the communication frame was transmitted. Specifically, the central notification signal output section 128 outputs an anomaly signal to the relay device from which the communication frame was transmitted in cases in which the communication frame ID of the received communication frame is not included as a communication frame ID in the central relay information, such that the relay target bus of the communication frame is not identified.

For example, in a case in which a communication frame has been transmitted from the relay device 14 to the central relay device 12 and the communication frame ID of the received communication frame is not included as a communication frame ID in the central relay information, the relay target bus of the communication frame transmitted from the relay device 14 is not identified, and so the central notification signal output section 128 of the central relay device 12 outputs an anomaly notification signal to the relay device 14 from which transmission was performed.

The relay device 14 is thus capable of detecting an error in the relay information in its own possession. The relay device 14 is also capable of recovering the correct relay information for relay information in which an error has arisen.

On receipt of an anomaly notification signal transmitted from the central relay device 12, the relay device 14 detects that there is a possibility that an error has arisen in the relay information in its own possession.

As illustrated in FIG. 1, the relay device 14 includes a reception section 140, a relay information storage section 142, an identification section 144, a recovery section 146, a forwarding section 147, and a notification signal output section 148.

The reception section 140 receives respective signals, including communication frames transmitted from other relay devices.

The relay information storage section 142 stores relay information, this being an example of second relay information. The relay information is information in which a communication frame ID expressing a destination address of each communication frame is associated with a relay target bus. The relay information is information in a similar format to the central relay information stored in the central relay information storage section 122 of the central relay device 12. The relay device 14 refers to the relay information to relay a communication frame received by the reception section 140 to a predetermined bus.

The identification section 144 identifies the relay target bus associated with the communication frame ID in the relay information as the relay target bus of the communication frame received by the reception section 140, based on the relay information held in the relay information storage section 142 and the communication frame ID included in the communication frame received by the reception section 140.

The recovery section 146 recovers the relay information in cases in which an anomaly notification signal output from the central relay device 12 has been received by the reception section 140. Specifically, the recovery section 146 recovers read relay information using existing technology, similarly to the central relay device 12.

The forwarding section 147 forwards the communication frame received by the reception section 140 to the identified relay target bus in cases in which the relay target bus of the communication frame received by the reception section 140 has been identified by the identification section 144.

Similarly to the central relay device 12, the notification signal output section 148 outputs an anomaly notification signal indicating an anomaly to the relay device from which the communication frame was transmitted in cases in which the relay target bus of the communication frame received by the reception section 140 is not identified by the identification section 144.

The central relay device 12 and the relay device 14 may, for example, be implemented by a computer 50 such as that illustrated in FIG. 3. The computer 50 includes a CPU 51, memory 52 serving as a temporarily storage region, and a non-volatile storage section 53. The computer 50 further includes an input/output interface (I/F) 54 to which an input/output device and so on (not illustrated in the drawings) are connected, and a read/write (R/W) section 55 that controls reading and writing of data with respect to a recording medium 59. The computer 50 further includes a network IN 56 connected to a network such as the internet. The CPU 51, the memory 52, the storage section 53, the input/output I/F 54, the R/W section 55, and the network I/F 56 are connected to one another through a bus 57.

The storage section 53 may be implemented by a hard disk drive (HDD), a solid state drive (SSD), flash memory, or the like. The storage section 53 serves as a storage medium, and is stored with a program to cause the computer 50 to function. The CPU 51 reads the program from the storage section 53 and expands the program in the memory 52, and sequentially executes processes included in the program.

Note that, for example, the central relay device 12 and the relay device 14 expand the central relay information or the relay information held in the storage section 53 in the memory 52 in order to refer to the central relay information or the relay information.

Next, explanation follows regarding operation of the relay system 10 of the first exemplary embodiment. Note that although the following explanation describes an example in which the central relay device 12 outputs an anomaly notification signal to the relay device 14, the relay device 14 is configured to output an anomaly notification signal to the central relay device 12 in a similar manner.

Figure 4:
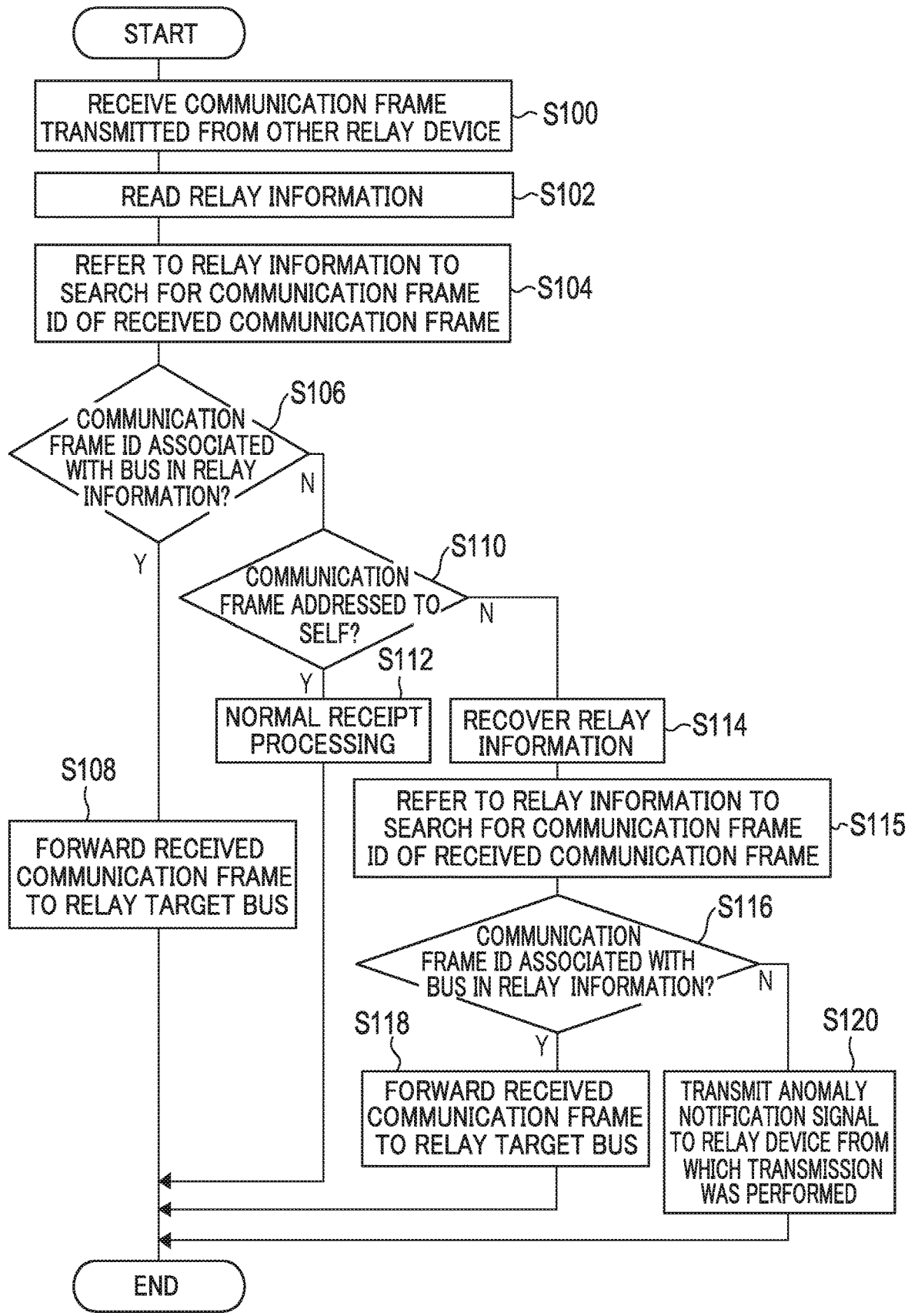
FIG. 4 is a flowchart illustrating an example of first relay processing of the first exemplary embodiment.

When a communication frame is transmitted from the relay device 14 to the central relay device 12, the central relay device 12 executes a first relay processing routine, illustrated in FIG. 4.

At step S100, the central reception section 120 receives the communication frame transmitted from the relay device 14, serving as an example of another relay device.

At step S102, the central identification section 124 reads the central relay information held in the central relay information storage section 122.

At step S104, the central identification section 124 attempts to identify the relay target bus of the communication frame based on the central relay information read at step S102 and the communication frame ID included in the communication frame received at step S100 Specifically, at step S104 the central identification section 124 refers to the central relay information read at step S102, and searches therein for the communication frame ID of the communication frame received at step S100.

At step S106, the central identification section 124 determines based on the processing results of step S104 whether or not the communication frame ID of the communication frame received at step S100 is associated with a relay target bus in the read central relay information. In cases in which the communication frame ID of the communication frame received at step S100 is associated with a relay target bus in the read central relay information, processing proceeds to step S108. On the other hand, in cases in which the communication frame ID of the communication frame received at step S100 is not associated with a relay target bus in the read central relay information, processing proceeds to step S110.

At step S108, the central forwarding section 127 forwards the communication frame received at step S100 to the relay target bus associated with the communication frame ID identified at step S104.

At step S110, the central identification section 124 determines based on the information included in the communication frame received at step S100 whether or not the received communication frame is a communication frame addressed to itself. In cases in which the communication frame received at step S100 is a communication frame addressed to itself, processing proceeds to step S112. On the other hand, in cases in which the communication frame received at step S100 is not a communication frame addressed to itself, processing proceeds to step S114.

At step S112, the central identification section 124 receives the communication frame received at step S100 as normal, as a frame addressed to itself. The communication frame that has been received as normal is then employed in some form of processing.

At step S114, the central recovery section 126 reads the backup central relay information held in a predetermined storage section (not illustrated in the drawings) different from the central relay information storage section 122. At step S114, the central recovery section 126 employs the backup central relay information to update the read central relay information in order to recover the central relay information.

At step S115, the central identification section 124 attempts to identify the relay target bus of the communication frame based on the central relay information recovered at step S114 and the communication frame ID included in the communication frame received at step S100.

At step S116, the central identification section 124 determines based on the processing results of step S115 whether or not the communication frame ID of the communication frame received at step S100 is associated with a relay target bus in the recovered central relay information. In cases in which the communication frame ID of the communication frame received at step S100 is associated with a relay target bus in the recovered central relay information, processing proceeds to step S118. On the other hand, in cases in which the communication frame ID of the communication frame received at step S100 is not associated with a relay target bus in the recovered central relay information, processing proceeds to step S120.

At step S118, the central forwarding section 127 forwards the communication frame received at step S100 to the relay target bus associated with the communication frame ID identified at step S115.

At step S120, the central notification signal output section 128 transmits an anomaly notification signal to the relay device 14 from which transmission was performed.

Figure 5:
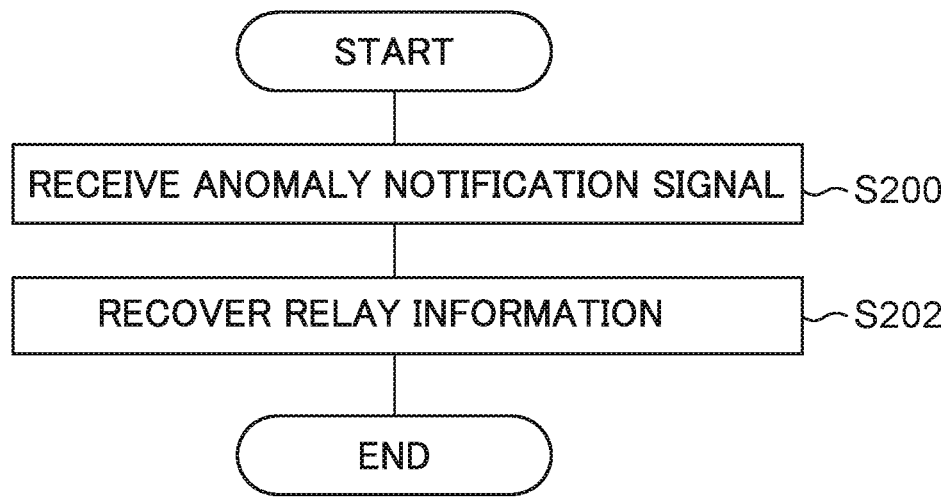
FIG. 5 is a flowchart illustrating an example of second relay processing of the first exemplary embodiment.

When the anomaly notification signal is transmitted from the central relay device 12 to the relay device 14, the relay device 14 executes a second relay processing routine, illustrated in FIG. 5.

At step S200, the reception section 140 receives the anomaly notification signal transmitted from the central relay device 12.

At step S202, the recovery section 146 recovers the relay information using existing technology.

The relay device 14 is thus able to detect an error in the relay information in its own possession. Moreover, the relay device 14 is able to recover the correct relay information for the relay information in which the error has arisen.

Figure 6:
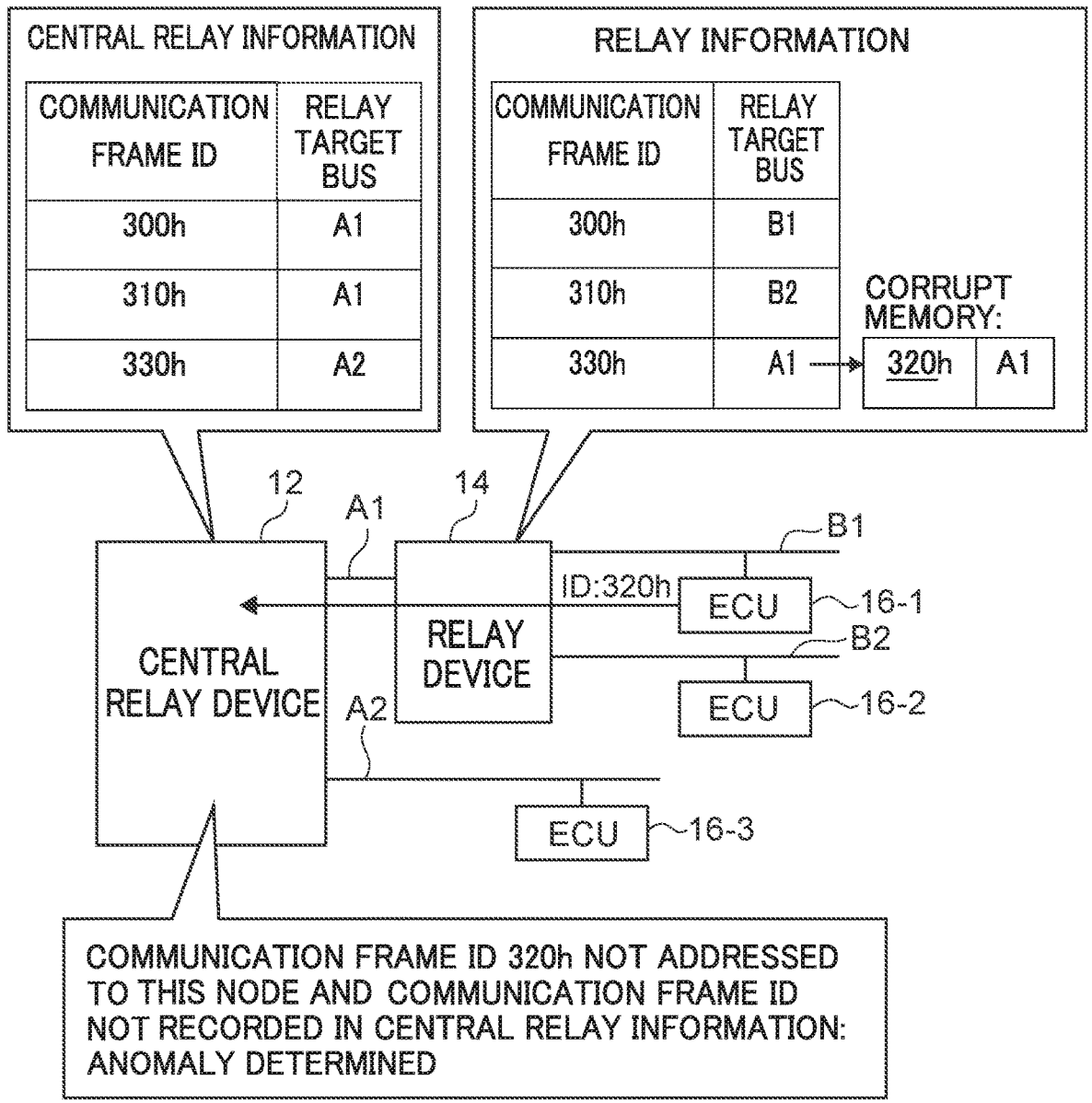
FIG. 6 is a diagram illustrating an example of operation of a relay system of the first exemplary embodiment.

FIG. 6 illustrates an example of operation of the relay system 10 of the first exemplary embodiment. FIG. 6 illustrates an example in which a communication frame has been transmitted from the ECU 16-1 and this communication frame has been received by the relay device 14. When this occurs, suppose an error arises in the relay information in the possession of the relay device 14 as a result of memory corruption, causing an error whereby the communication frame ID 330$h$ becomes 320$h$. For example, suppose the communication frame ID 320$h$ is a communication frame ID that should in theory only use the bus B1.

In such a case, the relay device 14 refers to the relay information in which the error has arisen, and identifies the bus A1 as the relay target bus of the communication frame. The relay device 14 then forwards the communication frame to the bus A1. The central relay device 12 then receives the communication frame transmitted from the relay device 14. When this occurs, as illustrated in FIG. 6, the communication frame ID 320$h$ of the communication frame forwarded from the relay device 14 is a communication frame ID that is not addressed to this node, and is not recorded in the central relay information. The central identification section 124 of the central relay device 12 is accordingly unable to identify the relay target bus of this communication frame. The notification signal output section 148 of the central relay device 12 thus outputs an anomaly notification signal to the relay device 14 from which the communication frame was transmitted.

Figure 7:
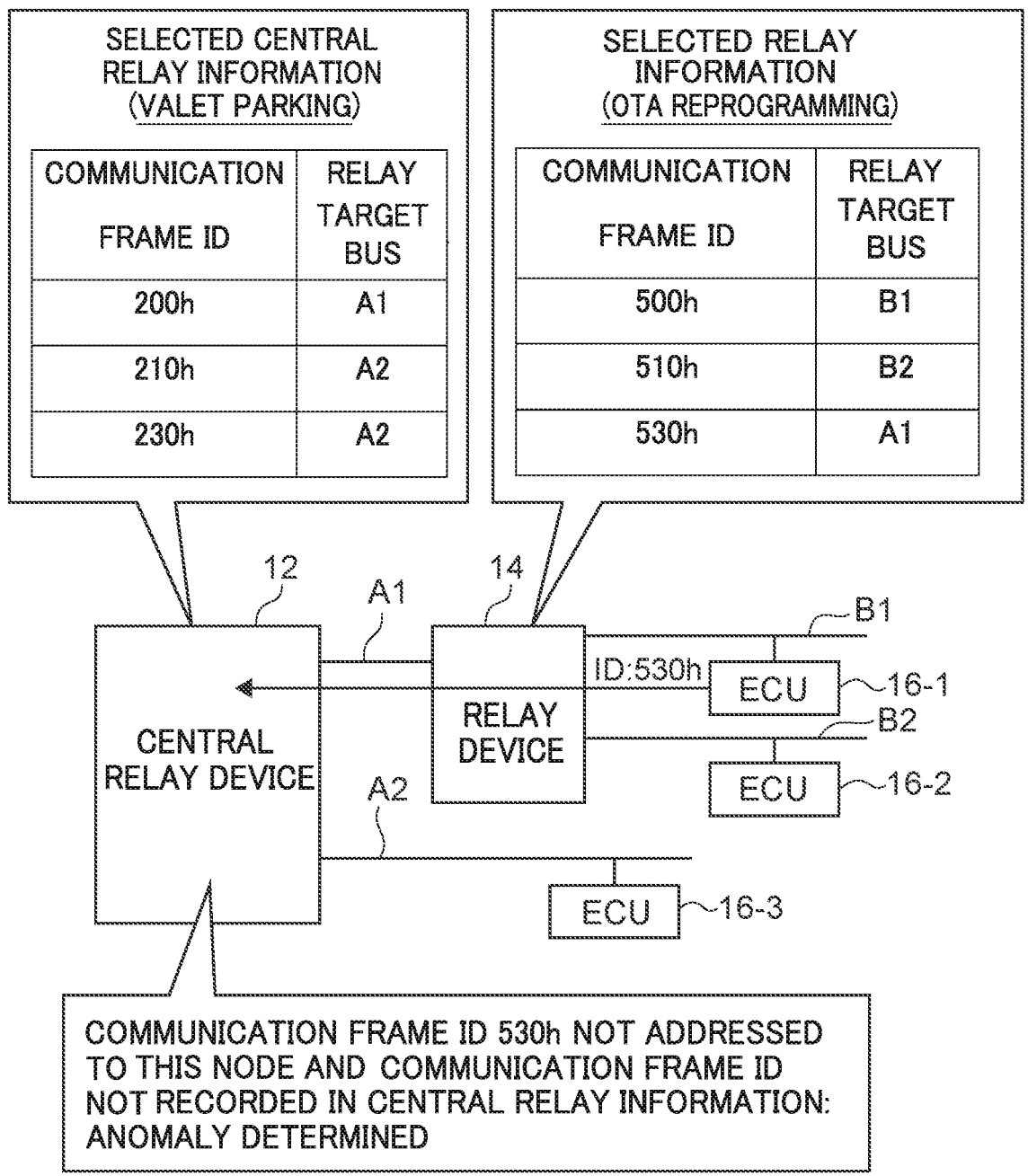
FIG. 7 is a diagram illustrating an example of operation of a relay system of the first exemplary embodiment.

FIG. 7 illustrates another example of operation of the relay system 10 of the first exemplary embodiment. FIG. 7 illustrates an example of a case in which the central relay information and the relay information are switched in response to a vehicle state.

As illustrated in FIG. 7, central relay information employed for valet parking has been selected in the central relay device 12, and relay information for over-the-air (OTA) reprogramming has been selected in the relay device 14. Note that valet parking refers to automated car parking in which, for example, a vehicle travels autonomously in a parking lot and parks itself autonomously in a vacant parking zone. OTA reprogramming refers to updating a program over a wireless network.

The introduction of new in-vehicle functionality such as OTA reprogramming and valet parking is anticipated to entail vehicle states other than normal travel. For example, operation in which relay information is switched according to the vehicle state is anticipated in response to vehicle states such as these.

In order to implement the above vehicle states, the respective relay devices are required to select relay information in response to a current vehicle state. However, if relay information that should not have been selected is selected as a result of a relay device anomaly or the like, a communication frame might not be relayed to the appropriate relay target.

For example, in FIG. 7, the vehicle state corresponds to "valet parking". However, the relay device 14 is referring to relay information for "OTA reprogramming", this being erroneous relay information. Consider a case in which a communication frame has been transmitted from the ECU 16-1. The relay device 14 receives the communication frame forwarded from the ECU 16-1, and recognizes the communication frame ID of this communication frame to be 530$h$. The relay device 14 then refers to the relay information for "OTA reprogramming", and thus forwards the received communication frame to the bus A1 as the relay target. Next, the central relay device 12 receives the communication frame transmitted from the relay device 14. However, since the communication frame ID 530$h$ is not included in the central relay information for "valet parking" to which the central relay device 12 refers, the central identification section 124 of the central relay device 12 is unable to identify the relay target bus of this communication frame. The notification signal output section 148 of the central relay device 12 accordingly outputs an anomaly notification signal to the relay device 14 from which transmission was performed.

The relay device 14 is thus capable of detecting an error in the relay information in its own possession. The relay device 14 is also able to recover the correct relay information for the relay information in which the error has occurred.

As described above, the central relay device according to the first exemplary embodiment receives communication frames transmitted from other relay devices. Based on the central relay information in which the communication frame ID expressing the destination address of the communication frame and the relay target bus are associated with each other and based on the communication frame ID included in the received communication frame, the central relay device identifies the relay target bus associated with the communication frame ID in the central relay information as the relay target bus of the communication frame. In cases in which the central relay device does not identify the relay target bus of the received communication frame due to the communication frame ID of the received communication frame not being included as a communication frame ID in the central relay information, the central relay device outputs an anomaly notification signal indicating an anomaly to the relay device from which the communication frame was transmitted. This enables any errors in the relay information employed in communication frame relay between plural relay devices installed in a vehicle to be detected. Moreover, the relay device from which the communication frame was transmitted is able to recover the correct relay information for the relay information in which an error has arisen.

In the relay system of the present exemplary embodiment, communication frame relay processing is performed in a similar manner to hitherto in cases in which no error has arisen in the relay information. This enables the occurrence of relay lag to be suppressed. This also enables the relay device in which an error in the relay information has arisen to be identified.

Moreover, in the relay system of the present exemplary embodiment, since the occurrence of an anomaly is detected from the relay information, the occurrence of an anomaly can be detected without any increase in the load on communication buses when operating correctly. For example, hitherto there have been cases in which broadcasting is employed to transmit connection information requests when an anomaly has been detected in a routing map (or MAC address table). So doing places load on the communication buses, whereas in the relay system of the present exemplary embodiment, since the occurrence of an anomaly is detected from the relay information, the occurrence of an anomaly can be detected without any increase in the load on communication buses when operating correctly.

Second Exemplary Embodiment

Explanation follows regarding a second exemplary embodiment. Note that since the configuration of a relay system according to the second exemplary embodiment is similar to that of the first exemplary embodiment, the same reference numerals are allocated and explanation thereof is omitted.

A relay system 10 according to the second exemplary embodiment differs from that of the first exemplary embodiment in the respect that, in cases in which central relay information or relay information is to be recovered, determination as to whether or not to recover the central relay information or relay information is made according to vehicle state.

Communication frame forwarding stops during recovery of central relay information or relay information. Accordingly, were the central relay device 12 or the relay device 14 of the relay system 10 to start recovery processing of the central relay information or relay information without consideration of the vehicle state of the vehicle, such recovery may be performed at a timing that is not appropriate.

Accordingly, the relay system 10 of the second exemplary embodiment performs central relay information or relay information recovery having considered the vehicle state. Specific explanation follows regarding this.

The central recovery section 126 of the central relay device 12 recovers the central relay information in cases in which the vehicle state is a predetermined state.

For example, the central recovery section 126 successively acquires the vehicle state. In cases in which central relay information is to be recovered, the central recovery section 126 recovers the central relay information when the vehicle state is a stationary state. In cases in which a stoppage of the central relay device 12 is needed, the central recovery section 126 recovers the central relay information when the vehicle state is a stationary state.

Moreover, the recovery section 146 of the relay device 14 also recovers the relay information in cases in which the vehicle state is a predetermined state.

For example, the recovery section 146 similarly successively acquires the vehicle state. In cases in which the relay information is to be recovered, the recovery section 146 recovers the relay information when the vehicle state is a stationary state. In cases in which a stoppage of the relay device 14 is needed, the recovery section 146 recovers the relay information when the vehicle state is a stationary state. Note that a stationary state refers to a state in which the vehicle is stationary, but the engine has not been turned off.

Performing recovery of the central relay information or relay information having considered the vehicle state enables any effect on other equipment installed in the vehicle to be reduced. Moreover, this also enables the recovery of central relay information to be performed at a timing that is appropriate for the vehicle.

Next, explanation follows regarding operation of the relay system 10 of the second exemplary embodiment. Note that although the following explanation describes an example of a case in which the central relay device 12 outputs an anomaly notification signal to the relay device 14, the relay device 14 is configured to output an anomaly notification signal to the central relay device 12 in a similar manner.

Figure 8:
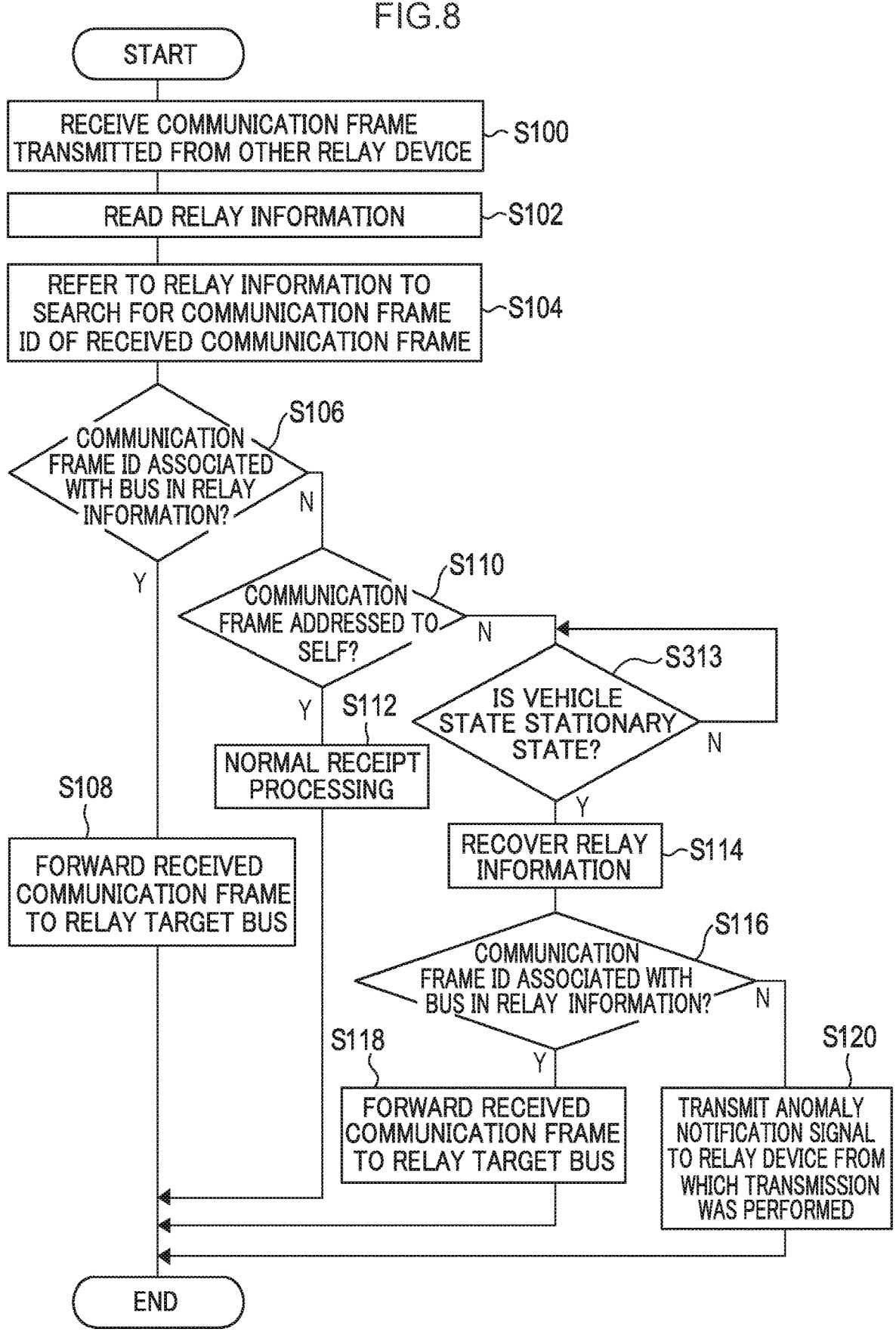
FIG. 8 is a flowchart illustrating an example of first relay processing of the second exemplary embodiment.

When a communication frame is transmitted from the relay device 14 to the central relay device 12, the central relay device 12 executes a first relay processing routine, illustrated in FIG. 8. Note that step S100 to step S112 of the first relay processing routine illustrated in FIG. 8 are similar to the corresponding steps in the first exemplary embodiment.

At step S313, the central recovery section 126 acquires the vehicle state, and determines whether or not the vehicle state is a stationary state. In cases in which the vehicle state is a stationary state, recovery of the central relay information is performed at step S114. On the other hand, in cases in which the vehicle state is not a stationary state, recovery of the central relay information is not performed until the vehicle state becomes a stationary state.

Step S114 to step S120 of the first relay processing routine illustrated in FIG. 8 are similar to the corresponding steps in the first exemplary embodiment.

When an anomaly notification signal is transmitted from the central relay device 12 to the relay device 14, the relay device 14 executes a second relay processing routine, illustrated in FIG. 9.

At step S200, the reception section 140 receives the anomaly notification signal transmitted from the central relay device 12.

At step S401, the recovery section 146 acquires the vehicle state, and determines whether or not the vehicle state is a stationary state. In cases in which the vehicle state is a stationary state, recovery of the relay information is performed at step S202. On the other hand, in cases in which the vehicle state is not a stationary state, recovery of the relay information is not performed until the vehicle state becomes a stationary state.

Note that other configuration and operation of the relay system according to the second exemplary embodiment are similar to those of the first exemplary embodiment, and so explanation thereof is omitted.

As described above, the central relay device according to the second exemplary embodiment recovers the central relay information in cases in which the vehicle state is a predetermined state (for example in cases in which the vehicle state is a stationary state). Moreover, the relay device according to the second exemplary embodiment recovers the relay information in cases in which the vehicle state is a predetermined state (for example in cases in which the vehicle state is a stationary state). This enables recovery of the central relay information or relay information to be performed at a timing that is appropriate for the vehicle.

Third Exemplary Embodiment

Explanation follows regarding a third exemplary embodiment. Note that where configuration of a relay system according to the third exemplary embodiment is similar to that of the first exemplary embodiment, such configuration is allocated the same reference numerals, and explanation thereof is omitted.

A relay system 10 according to the third exemplary embodiment differs from the first exemplary embodiment and the second exemplary embodiment in the respect that the plural ECUs installed in the vehicle are each classified according to functionality, and these ECUs sorted by functionality are overseen by relay devices.

FIG. 10 is a block diagram illustrating an example of configuration of the relay system according to the third exemplary embodiment.

As illustrated in FIG. 10, a relay system 310 of the third exemplary embodiment includes a specific central relay device 312-1, this being an example of a first specific relay device, plural specific relay devices 314-1, 314-2, these being examples of plural second specific relay devices, and plural specific ECUs 17-1, 17-2, 17-3, 17-4, 17-5, and 17-6, these being ECUs involved in vehicle travel. The specific central relay device 312-1 and the specific relay devices 314-1, 314-2 are devices that oversee the specific ECUs 17-1, 17-2, 17-3, 17-4, 17-5, and 17-6. The specific ECUs 17-1, 17-2, 17-3, 17-4, 17-5, and 17-6 are examples of plural vehicle travel control units.

As illustrated in FIG. 10, the relay system 310 of the third exemplary embodiment further includes a central relay device 312-2, plural relay devices 314-3, 314-4, and plural ECUs 17-7, 17-8, 17-9, 17-10, 17-11, and 17-12 that differ from the specific ECUs. The central relay device 312-2 and the relay devices 314-3, 314-4 are devices that oversee the ECUs 17-7, 17-8, 17-9, 17-10, 17-11, and 17-12. The ECUs 17-7, 17-8, 17-9, 17-10, 17-11, and 17-12 are an example of plural vehicle control units. The ECUs 17-7, 17-8, 17-9, 17-10, 17-11, and 17-12 are ECUs not involved in vehicle travel, and are for example ECUs for controlling audio functions and the like.

As illustrated in FIG. 10, the plural specific ECUs 17-1, 17-2, 17-3, 17-4, 17-5, and 17-6 involved in vehicle travel are connected to the specific central relay device 312-1 out of the plural central relay devices. Moreover, as illustrated in FIG. 10, the plural specific ECUs 17-1, 17-2, 17-3, and 17-4 that are involved in vehicle travel are connected to the specific relay devices 314-1, 314-2 out of the plural relay devices.

Also as illustrated in FIG. 10, the plural ECUs 17-11, 17-12 that are different from the specific ECUs are connected to the central relay device 312-2 that is different from the specific central relay device 312-1 out of the plural central relay devices. As illustrated in FIG. 10, the plural ECUs 17-7, 17-8, 17-9, and 17-10 that are different from the specific ECUs are connected to the relay devices 314-3, 314-4 that are different from the specific relay devices 314-1, 314-2 out of the plural relay devices.

Since the specific ECUs are ECUs involved in vehicle travel, it may not be appropriate for the specific central relay device 312-1 or the specific relay devices 314-1, 314-2 that oversee the specific ECUs to perform recovery of relay information or central relay information when the vehicle state is a traveling state.

Accordingly, the specific central relay device 312-1 of the third exemplary embodiment recovers central relay information in cases in which the relay target bus of a communication frame has not been identified and the vehicle state is a stationary state. The specific relay devices 314-1, 314-2 likewise recover relay information in cases in which the relay target bus of a communication frame has not been identified and vehicle state is a stationary state.

On the other hand, the central relay device 312-2 recovers central relay information in cases in which the relay target bus of a communication frame has not been identified. The relay devices 314-3, 314-4 likewise recover relay information in cases in which the relay target bus of a communication frame has not been identified.

Accordingly, since the specific central relay device 312-1 or the specific relay devices 314-1, 314-2 that oversee the specific ECUs do not perform recovery of central relay information or relay information in cases in which the vehicle is in a traveling state, the central relay information and the relay information can be recovered without affecting the specific ECUs that are involved in vehicle travel.

As described above, the specific central relay device 312-1 recovers the central relay information in cases in which the relay target bus of a communication frame has not been identified and the vehicle state is a stationary state. The specific relay devices 314-1, 314-2 likewise recover the relay information in cases in which the relay target bus of a communication frame has not been identified and the vehicle state is a stationary state. This enables the central relay information and relay information to be recovered without affecting the specific ECUs that are involved in vehicle travel. This also enables the recovery of central relay information and relay information to be performed at a timing that is appropriate for the vehicle.

Note that although explanation has been given in which the processing performed by the various devices of the exemplary embodiments described above is software processing implemented by executing a program, this processing may be performed by hardware. Alternatively, the processing may be performed by a combination of both software and hardware. Moreover, the program stored in the ROM may be stored in various storage media and distributed therefrom.

The technology disclosed herein is not limited by the above, and obviously various modifications may be implemented within a range not departing from the spirit thereof.

For example, in the exemplary embodiments described above, explanation has been given regarding an example in which the relay device 14 recovers relay information in cases in which an anomaly notification signal has been received. However, there is no limitation thereto. For example, the recovery section 146 of the relay device 14 may recover relay information in cases in which anomaly notification signals have been received on plural occasions. This enables recovery to be performed for relay information that may be considered more likely to be erroneous.

Moreover, the recovery section 146 of the relay device 14 may recover relay information when anomaly notification signals have been received on plural occasions in cases in which the number of relay devices connected to the relay device 14 is greater than the number of relay devices connected to the central relay device 12. In cases in which the number of other relay devices connected to the relay device 14 is greater than the number of relay devices connected to the central relay device 12, the relay device 14 does not immediately recover the second relay information, even if an anomaly notification signal has been received. This enables any effect on the connected relay devices as a result of the relay device 14 recovering the relay information to be reduced. Moreover, the relay device 14 recovers the relay information in cases in which anomaly notification signals have been received on a predetermined number of occasions or greater, thereby enabling the relay information to be recovered in cases in which out of the central relay device 12 and the relay device 14, the relay information of the relay device 14 is more likely to be erroneous.

In the third exemplary embodiment, explanation has been given regarding an example in which the plural ECUs installed in the vehicle are each classified by function, and the ECUs sorted by functionality are overseen by the relay devices. However, there is no limitation thereto. For example, there is no limitation to the third exemplary embodiment in cases in which plural ECUs disposed within the vehicle are overseen by a single relay device.

The disclosures of Japanese Patent Application No. 2020-8494 filed on Jan. 22, 2020 are incorporated herein by reference in their entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. A first relay device for installation at a vehicle, the first relay device comprising:
    a first memory; and
    a first processor coupled to the first memory;
    the first processor being configured to:
        receive a communication frame transmitted from another relay device;
        based on first relay information, in which destination address information expressing a destination address of the received communication frame and a relay target bus are associated with each other, and based on the destination address information included in the received communication frame, identify the relay target bus associated with the destination address information in the first relay information as a relay target bus of the received communication frame; and
        in a case in which the relay target bus of the received communication frame is not identified due to the destination address information of the received communication frame not being included in the destination address information of the first relay information, output an anomaly notification signal indicating an anomaly to the other relay device,
    wherein the first processor is configured to recover the first relay information when the vehicle state is a stationary state, in a case in which a stoppage of the first relay device is needed in order to recover the first relay information.

2. The first relay device of claim 1, wherein the first processor is configured to recover the first relay information, in a case in which the relay target bus of the received communication frame is not identified.

3. The first relay device of claim 2, wherein the first processor is configured to recover the first relay information, in a case in which a vehicle state is a predetermined state.

4. A second relay device connected to a first relay device so as to be capable of communicating therewith, the second relay device comprising:
    a second memory; and
    a second processor coupled to the second memory;
    the second processor being configured to:
        receive a communication frame transmitted from the first relay device and another relay device;
        based on second relay information in which destination address information expressing a destination address of the received communication frame and a relay target bus are associated with each other, and based on destination address information included in the received communication frame, identify the relay target bus associated with the destination address information in the second relay information as a relay target bus of the received communication frame; and
        recover the second relay information in a case in which an anomaly notification signal output from the first relay device has been received,
    wherein the second processor is configured to recover the second relay information when the vehicle state is a stationary state, in a case in which a stoppage of the second relay device is needed in order to recover the second relay information.

5. The second relay device of claim 4, wherein the second processor is configured to recover the second relay information, in a case in which the anomaly notification signal has been received on a plurality of occasions.

6. The second relay device of claim 4, wherein the second processor is configured to recover the second relay information, in a case in which a vehicle state is a predetermined state.

7. The second relay device of claim 4, wherein the second processor is configured to recover the second relay information when the anomaly notification signal has been received on a plurality of occasions, in a case in which a number of relay devices connected to the second relay device is greater than a number of relay devices connected to the first relay device.

8. A relay system comprising a first relay device and a second relay device,
    the first relay device being for installation at a vehicle, and the first relay device comprising:
    a first memory; and
    a first processor coupled to the first memory,
    the first processor being configured to:
        receive a communication frame transmitted from another relay device;

based on first relay information, in which destination address information expressing a destination address of the received communication frame and a relay target bus are associated with each other, and based on destination address information included in the received communication frame, identify the relay target bus associated with the destination address information in the first relay information as a relay target bus of the received communication frame; and in a case in which the relay target bus of the received communication frame is not identified due to the destination address information of the received communication frame not being included in the destination address information of the first relay information, output an anomaly notification signal indicating an anomaly to the other relay device, the second relay device being connected to the first relay device so as to be capable of communicating therewith, and the second relay device comprising:

a second memory; and a second processor coupled to the second memory, the second processor being configured to:

receive a communication frame transmitted from the first relay device and another relay device;

based on second relay information in which destination address information expressing a destination address of the received communication frame and a relay target bus are associated with each other, and based on destination address information included in the received communication frame, identify the relay target bus associated with the destination address information in the second relay information as a relay target bus of the received communication frame; and recover the second relay information in a case in which the anomaly notification signal output from the first relay device has been received.

9. The relay system of claim 8, further comprising:

a plurality of the first relay devices in which the first processor is configured to recover the first relay information, in a case in which the relay target bus of the received communication frame is not identified, the first processor is configured to recover the first relay information, in a case in which a vehicle state is a predetermined state; and a plurality of the second relay devices in which the second processor is configured to recover the second relay information, in a case in which a vehicle state is a predetermined state, wherein:

a plurality of vehicle travel control units involved in vehicle travel are connected to a first specific relay device configured by a specific first relay device from among the plurality of first relay devices;

the plurality of vehicle travel control units involved in vehicle travel are connected to a second specific relay device configured by a specific second relay device from among the plurality of second relay devices;

a plurality of vehicle control units different from the vehicle travel control units are connected to a first relay device different from the first specific relay device from among the plurality of first relay devices;

the plurality of vehicle control units different from the vehicle travel control units are connected to a second relay device different from the second specific relay device from among the plurality of second relay devices;

the first specific relay device recovers the first relay information, in a case in which the relay target bus of the received communication frame is not identified and the vehicle state is a stationary state;

the second specific relay device recovers the second relay information, in a case in which the anomaly notification signal has been received from a relay device to which the communication frame was transmitted and the vehicle state is a stationary state;

the first relay device that is different from the first specific relay device recovers the first relay information, in a case in which the relay target bus of the received communication frame is not identified; and the second relay device that is different from the second specific relay device recovers the second relay information, in a case in which the anomaly notification signal has been received from the relay device to which the communication frame was transmitted.

* * * * *